United States Patent
Nerurkar

(10) Patent No.: US 12,282,452 B2
(45) Date of Patent: Apr. 22, 2025

(54) FRAMEWORK FOR MIGRATING APPLICATIONS TO CLOUD COMPUTING ENVIRONMENT

(71) Applicant: Hartford Fire Insurance Company, Hartford, CT (US)

(72) Inventor: Rajesh Kamlakar Nerurkar, Charlotte, NC (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

(21) Appl. No.: 18/599,664

(22) Filed: Mar. 8, 2024

(65) Prior Publication Data

US 2024/0211432 A1    Jun. 27, 2024

Related U.S. Application Data

(63) Continuation of application No. 17/648,055, filed on Jan. 14, 2022, now Pat. No. 11,954,064.

(51) Int. Cl.
| | | |
|---|---|---|
| G06F 16/00 | (2019.01) | |
| G06F 16/11 | (2019.01) | |
| H04L 67/00 | (2022.01) | |
| H04L 67/10 | (2022.01) | |

(52) U.S. Cl.
CPC .......... G06F 16/119 (2019.01); H04L 67/10 (2013.01); H04L 67/34 (2013.01)

(58) Field of Classification Search
None
See application file for complete search history.

(56) References Cited

U.S. PATENT DOCUMENTS

| | | | | |
|---|---|---|---|---|
| 11,954,064 | B2* | 4/2024 | Nerurkar | G06F 16/119 |
| 2012/0089497 | A1* | 4/2012 | Taylor | G06Q 40/04 |
| | | | | 705/35 |
| 2015/0188779 | A1* | 7/2015 | McCanne | H04L 63/10 |
| | | | | 709/223 |
| 2017/0193021 | A1* | 7/2017 | Deng | G06F 8/63 |
| 2020/0099772 | A1* | 3/2020 | Ray | H04L 67/34 |
| 2020/0134750 | A1* | 4/2020 | Wolf | H04L 41/0866 |
| 2020/0304571 | A1* | 9/2020 | Ranjan | G06F 3/0605 |

(Continued)

*Primary Examiner* — Hasanul Mobin
(74) *Attorney, Agent, or Firm* — Buckley, Maschoff & Talwalkar LLC

(57) ABSTRACT

A cloud migration framework may include an enterprise application data store that contains electronic records associated with enterprise applications. Each record may include, for example, an electronic record identifier and enterprise application parameters. A data repository stores a catalogue of cloud computing patterns. A back-end application computer server retrieves information from the enterprise application data store and, based on enterprise application parameters, creates a move group representing a subset of the enterprise applications. For each application in the move group, the computer server identifies whether an appropriate cloud computing pattern exists in the catalogue. If an appropriate cloud computing pattern is identified, it is used to automatically create a reference implementation of the enterprise application in a cloud computing environment. If no appropriate cloud computing pattern is identified, a pattern on-boarding process may be initiated to add a new cloud computing pattern to the catalogue.

18 Claims, 14 Drawing Sheets

(56) References Cited

U.S. PATENT DOCUMENTS

| | | | |
|---|---|---|---|
| 2021/0004738 A1* | 1/2021 | Zolotow | G06N 20/00 |
| 2021/0174280 A1* | 6/2021 | Ratnapuri | G06Q 10/06315 |
| 2023/0179498 A1* | 6/2023 | Colenbrander | A63F 13/358 |
| | | | 709/224 |
| 2023/0229625 A1* | 7/2023 | Nerurkar | G06F 8/60 |
| | | | 707/809 |

* cited by examiner

FRAMEWORK FOR MIGRATING APPLICATIONS TO CLOUD COMPUTING ENVIRONMENT

CROSS-REFERENCE TO RELATED APPLICATIONS

The present application is a continuation of U.S. patent application Ser. No. 17/648,055 entitled "FRAMEWORK FOR MIGRATING APPLICATIONS TO CLOUD COMPUTING ENVIRONMENT" and filed Jan. 14, 2022. The entire content of that application is incorporated herein by reference.

TECHNICAL FIELD

The present application generally relates to computer systems and more particularly to computer systems that are adapted to accurately and/or automatically migrate applications to a cloud computing environment.

BACKGROUND

An enterprise may use applications to perform various tasks. For example, an enterprise application might process business functions associated with customer service, human resources, sales, etc. Typically, such applications were executed using an on-premises computing environment (e.g., various servers, data stores, etc. were hosted on hardware local to the enterprise). Increasingly, however, enterprise applications are migrating to a cloud-based computing environment (e.g., to reduce cost, improve availability, etc.), such as AMAZON® Web Services ("AWS"). Replacing an on-premises application with an application suitable for a cloud computing environment, however, can be a time consuming and difficult task—especially when there are a substantial number of enterprise applications that need to be moved.

It would therefore be desirable to provide improved systems and methods to accurately and/or automatically migrate applications to a cloud computing environment. Moreover, results should be easy to access, understand, interpret, update, etc.

SUMMARY OF THE INVENTION

According to some embodiments, systems, methods, apparatus, computer program code and means are provided to accurately and/or automatically migrate applications to a cloud computing environment in a way that provides fast and useful results and that allows for flexibility and effectiveness when implementing those results.

Some embodiments are directed to a cloud migration framework implemented via a back-end application computer server. The cloud migration framework may include an enterprise application data store that contains electronic records associated with enterprise applications. Each record may include, for example, an electronic record identifier and enterprise application parameters. A data repository stores a catalogue of cloud computing patterns. The back-end application computer server retrieves information from the enterprise application data store and, based on enterprise application parameters, creates a move group representing a subset of the enterprise applications. For each application in the move group, the computer server identifies whether an appropriate cloud computing pattern exists in the catalogue. If an appropriate cloud computing pattern is identified, it is used to automatically create a reference implementation of the enterprise application in a cloud computing environment. If no appropriate cloud computing pattern is identified, a pattern on-boarding process may be initiated to add a new cloud computing pattern to the catalogue.

Some embodiments comprise: means for retrieving, by a computer processor of a back-end application computer server, information from an enterprise application data store that contains electronic records associated with a set of enterprise applications, each electronic record including an electronic record identifier and at least one enterprise application parameter; based on enterprise application parameters, means for automatically creating a move group representing a subset of the enterprise applications in the enterprise application data store; and, for each enterprise application in the move group, means for identifying whether an appropriate cloud computing pattern exists in a catalogue of cloud computing patterns stored at a data repository; if an appropriate cloud computing pattern is identified, means for using the identified cloud computing pattern to automatically create a reference implementation of the enterprise application in a cloud computing environment; and if no appropriate cloud computing pattern is identified, means for initiating a pattern on-boarding process to add a new cloud computing pattern to the catalogue stored in the data repository.

In some embodiments, a communication device associated with a back-end application computer server exchanges information with remote devices in connection with an interactive graphical administrator interface. The information may be exchanged, for example, via public and/or proprietary communication networks.

A technical effect of some embodiments of the invention is an improved and computerized way to accurately and/or automatically migrate applications to a cloud computing environment in a way that provides fast and useful results. With these and other advantages and features that will become hereinafter apparent, a more complete understanding of the nature of the invention can be obtained by referring to the following detailed description and to the drawings appended hereto.

DETAILED DESCRIPTION

Figure 1:
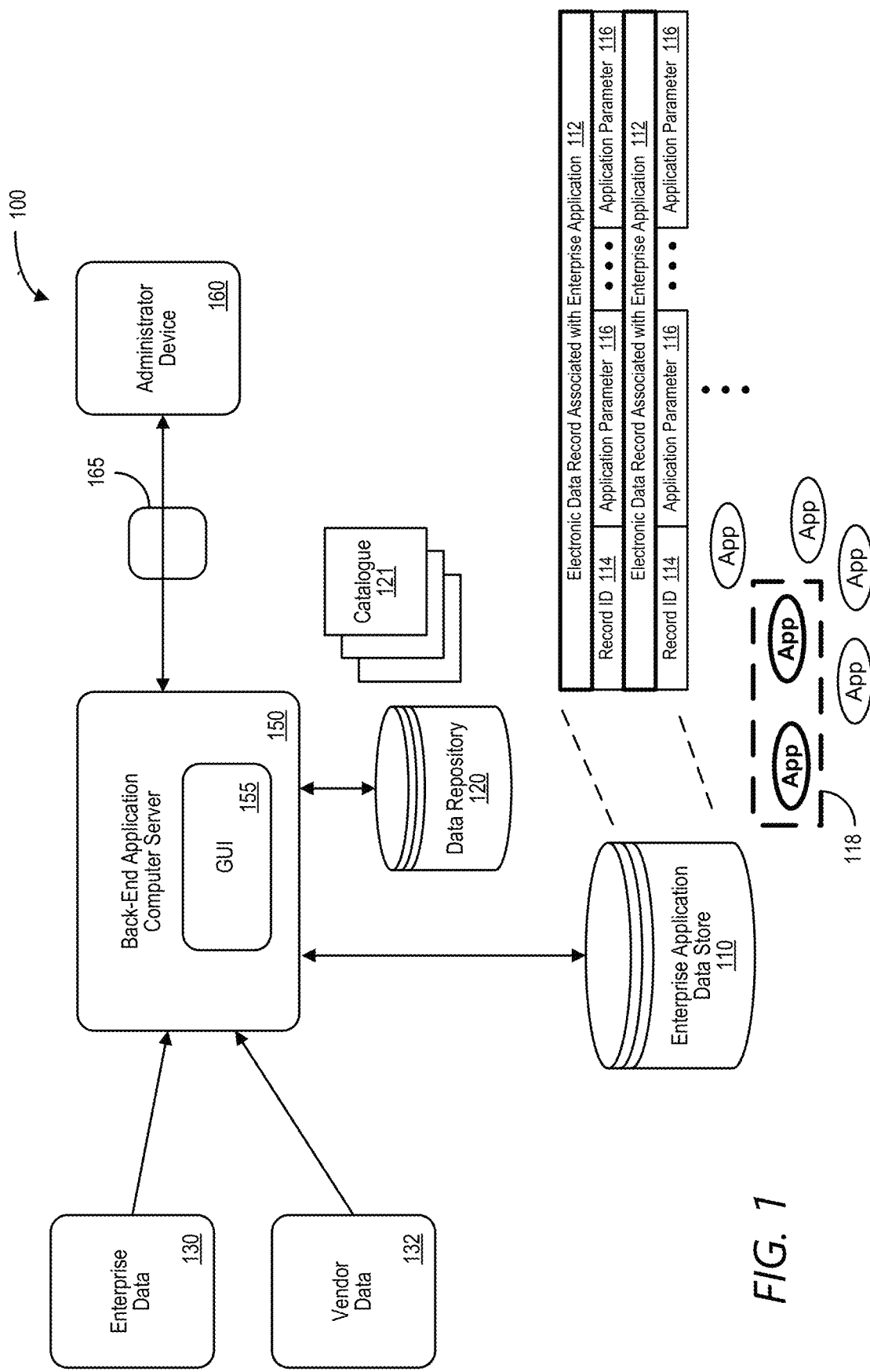
FIG. 1 is a high-level block diagram of an application migration framework in accordance with some embodiments.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate data efficiency and usefulness associated with an application migration framework. The present invention is directed to more than merely a computer implementation of a routine or conventional activity previously known in the industry as it provides a specific advancement in the area of electronic record analysis by providing improvements in the operation of a computer system that facilitates the migration of enterprise applications to a cloud computing environment. The present invention provides improvement beyond a mere generic computer implementation as it involves the novel ordered combination of system elements and processes to provide improvements in the speed and ease of such migrations. Some embodiments of the present invention are directed to a system adapted to automatically identify groups of applications to be moved together, identify patterns that can be used to assist the migration, etc. Moreover, communication links and messages may be automatically established, aggregated, formatted, exchanged, etc. to improve network performance (e.g., by reducing an amount of network messaging bandwidth and/or storage required to implement such migrations, support technological updates, etc.).

FIG. 1 is a high-level block diagram of an application migration framework or system 100 according to some embodiments of the present invention. In particular, the system 100 includes a back-end application computer server 150 that may access information in an enterprise application data store 110 (e.g., storing a set of electronic records associated with a set of enterprise applications 112, each record including, for example, one or more record identifiers 114, application parameters 116 such as inputs, outputs, application descriptions, etc.). The back-end application computer server 150 may also exchange information with other data stores (e.g., a data repository 120) and utilize a Graphical User Interface ("GUI") 155 to view, analyze, and/or update the electronic records. The back-end application computer server 150 may also exchange information with a remote administrator device 160 (e.g., via a firewall 165). According to some embodiments, enterprise data 130 (e.g., information about legacy on-premises application) and/or vendor data 132 may be aggregated and provided to assist a migration and/or transmitted the remote administrator device 160. In some embodiments, the remote administrator device 160 may transmit annotated and/or updated information to the back-end application computer server 150. Based on the updated information, the back-end application computer server 150 may adjust data in the enterprise application data store 110, the data repository 120, and/or the change may be viewable via other remote administrator devices. Note that the back-end application computer server 150 and/or any of the other devices and methods described herein might be associated with a third party, such as a vendor that performs a service for an enterprise.

The back-end application computer server 150 and/or the other elements of the system 100 might be, for example, associated with a Personal Computer ("PC"), laptop computer, smartphone, an enterprise server, a server farm, and/or a database or similar storage devices. According to some embodiments, an "automated" back-end application computer server 150 (and/or other elements of the system 100) may facilitate the automated access and/or update of electronic records. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the enterprise application data store 110 and the data repository 120. The data store 110 and data repository 120 may be locally stored or reside remote from the back-end application computer server 150. As will be described further below, the enterprise application data store 110 may be used by the back-end application computer server 150 in connection with an interactive migration interface to access and update electronic records. Although a single back-end application computer server 150 is shown in FIG. 1, any number of such devices may be included. Moreover, various devices described herein might be combined according to embodiments of the present invention. For example, in some embodiments, the back-end application computer server 150 and enterprise application data store 110 might be co-located and/or may comprise a single apparatus and/or be implemented via a cloud-based computing environment.

The information in the enterprise application data store 110 may represent a set of applications ("apps") that need to be migrated to a cloud computing environment. According to some embodiments, the system 100 may automatically identify a sub-set of those applications as a "move group" 118 that can be efficiently migrated together. This might be based on, for example, technology stacks associated with the applications, dependencies between the applications (e.g., an output of application A is provided as an input to application B and, as a result, they might be migrated together), etc. Moreover, the data repository 120 may contain a catalogue 121 of patterns that can be used as templates to assist in the migration.

Figure 2:
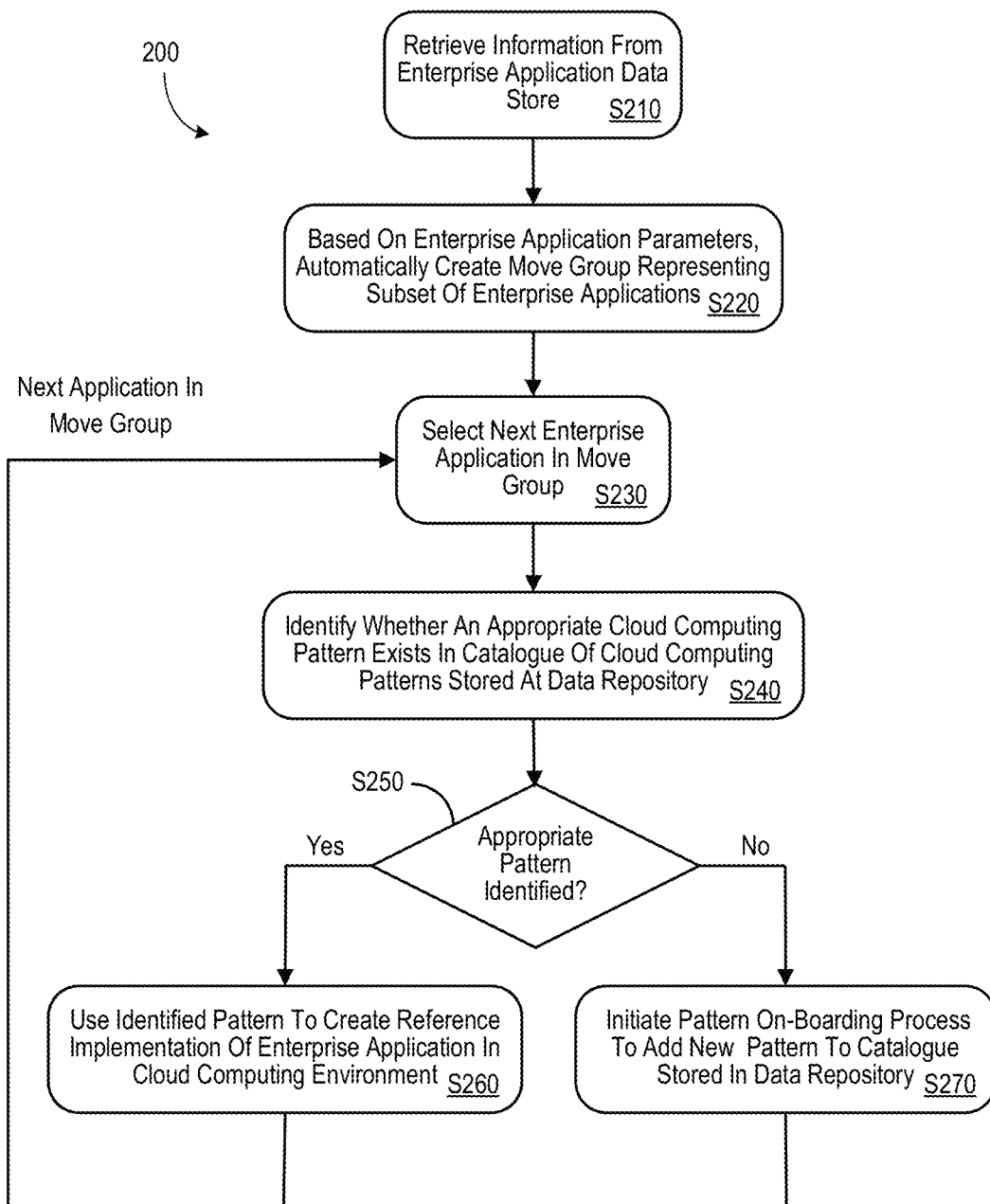
FIG. 2 illustrates a cloud migration method according to some embodiments of the present invention.

Note that the system 100 of FIG. 1 is provided only as an example, and embodiments may be associated with additional elements or components. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a back-end application computer server may retrieve information from an enterprise application data store that contains electronic records associated with a set of enterprise applications. Each electronic record might include, for example, an electronic record identifier and at least one enterprise application parameter. The set of enterprise applications in the enterprise application data store might be associated with, for example, on-premises applications, legacy applications, etc. Based on enterprise application parameters, at S220 the computer server may automatically create a move group representing a subset of the enterprise applications in the enterprise application data store. The automatically created move group might be based on, for example, technology stacks, enterprise Lines Of Business ("LOB"), application dependencies, etc. According to some embodiments, the creation of a move group at S220 is based at least in part on how closely coupled various enterprise applications are to each other (e.g., do they share common characteristics such as technology stacks, application styles, etc.).

At S230, the system will select an enterprise application in the move group (until all applications have been processed). For each enterprise application in the move group, at S240 the system may identify whether an appropriate cloud computing pattern exists in a catalogue of cloud computing patterns stored at a data repository. For example, patterns might be associated with integration patterns or templates, deployment patterns, Development, Security, and Operations ("DevSecOps") patterns, etc. According to some embodiments, patterns may be associated with, composite patterns, reference implementations, a Single Page Application ("SPA"), a Multi-Page Application ("MPA"), an Event Driven Architecture ("EDA"), microservices, etc. Moreover, patterns might be associated with an integration type, an inbound flow direction, an outbound flow direction, foundational patterns, primitive patterns, guardrail patterns, etc.

If an appropriate cloud computing pattern is identified at S250, the system may use the identified cloud computing pattern (e.g., a foundational pattern) to automatically facilitate creation of a reference implementation for the enterprise application in a cloud computing environment at S260. Note that the identification of an appropriate cloud computing pattern at S250 and/or the creation of the reference implementation at S260 might be based at least in part on characteristics of the applications within the move group being migrated (e.g., technology stacks, application styles, DevSecOps deployment, etc.). If no appropriate cloud computing pattern is identified at S250, the system may initiate a pattern on-boarding process to add a new cloud computing pattern to the catalogue stored in the data repository at S270. According to some embodiments, the data repository includes version control such as the GITHUB® data repository. The method 200 may then continue with the selection of the next application within the move group being migrated at S230. According to some embodiments, the back-end application computer server, after the migration of one move group is initiated, further begins to migrate a subsequent move group. Moreover, an appropriate cloud computing pattern for an enterprise application in the subsequent move group might have been added via a prior on-boarding process. In this way, system may continuously build the catalog of computing patterns in the data repository.

Note that a migration analysis for LOB delivery teams may have a plan and each move group may have its unique set of application deployment and integration needs (e.g., some move groups may have a common set of application deployment and integration needs with and across multiple LOB. A lack of cloud application reference architecture patterns might create inconsistencies around how applications are migrated to the cloud. That is, not having a model reference implementation to follow might result in different ways of solutioning the same problem across delivery teams. Some embodiments may instead deliver cloud application reference architecture patterns that cater to the needs of application move groups across all LOB within an enterprise. Some embodiments may deliver reference implementations that show how to use these patterns together to develop a fully working solution in a cloud computing environment that can then be used as a model during application migration.

Figure 3:
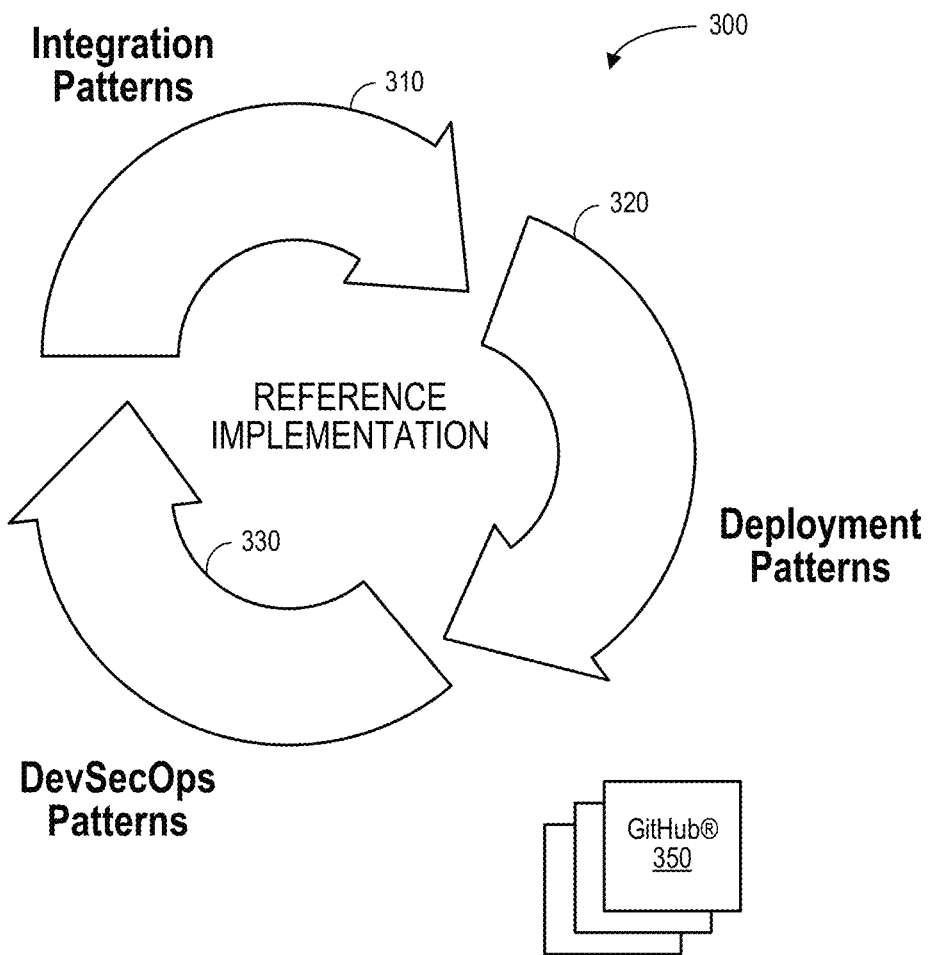
FIG. 3 is a patterns development approach in accordance with some embodiments.

FIG. 3 is a patterns development approach 300 in accordance with some embodiments. In particular, integration patterns 310 may be derived from a unique set of integration types identified by an enterprise program across move groups (API, event, file and, database-based integrations) and may require integration within a cloud computing environment. For example, integration patterns 310 might require integration within an AMAZON® WEB SERVICES ("AWS") cloud account, across enterprise and vendor AWS accounts, across enterprise AWS accounts and on-premises infrastructures, across an enterprise AWS account and a vendor Software as a Service ("SaaS") platform, etc. Deployment patterns 320 may be derived from a unique set of target state technology stacks identified across multiple move groups. DevSecOps Patterns 330 may be derived from a unique set of service runtime infrastructure required by deployment patterns. Note that pattern development may focus on the needs of enterprise applications within all move groups across all LOB by identifying unique deployment patterns 320, integration patterns 310, and/or DevSecOps patterns 330 and a reference implementation may be created using these patterns. Code artifacts for the patterns and the reference implementation may be stored in a data repository such as GITHUB® 350. The data repository may provide for software development and version control (e.g., offering distributed version control and Source Code Management ("SCM") functionality to provide access control) and collaboration features such as bug tracking, feature requests, task management, continuous integration, project wikis, etc.

Figure 4:
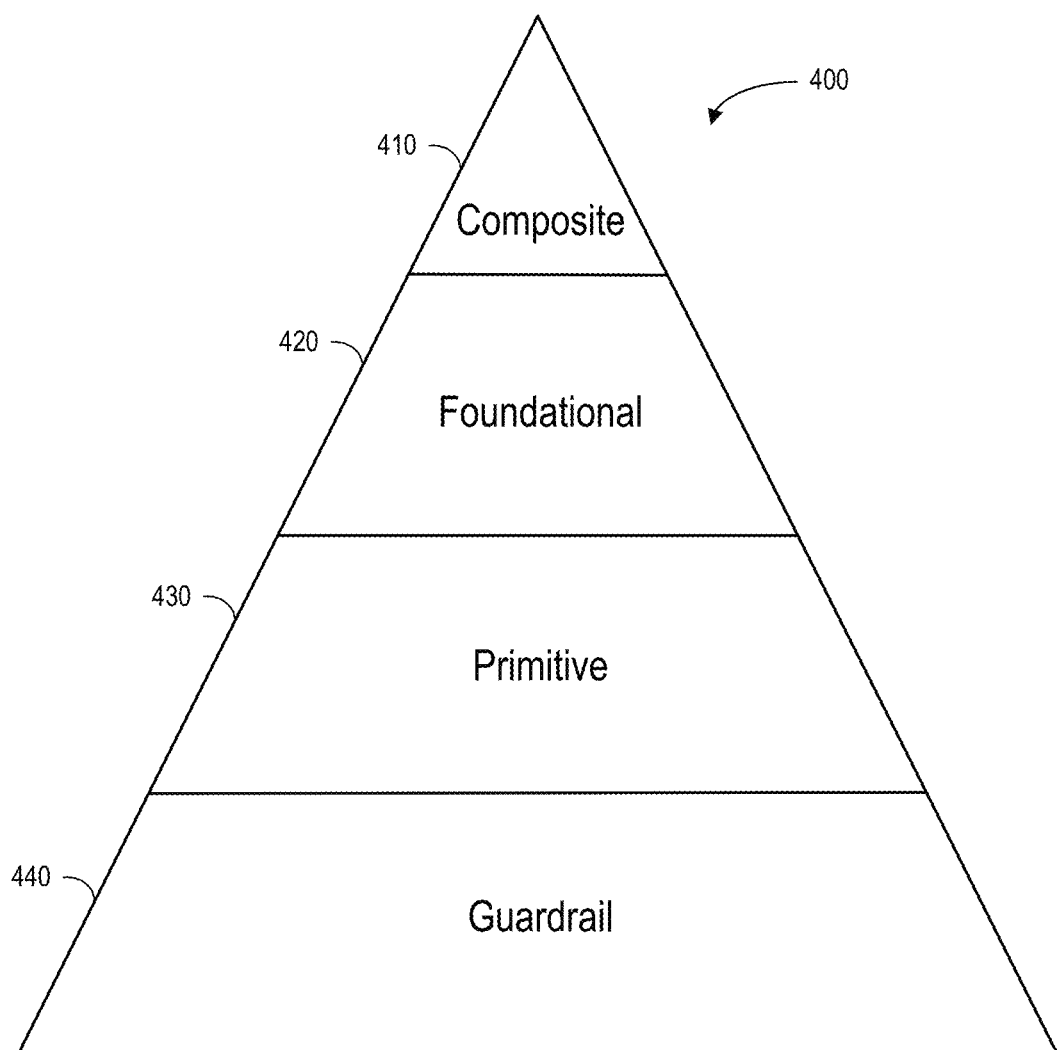
FIG. 4 illustrates patterns organization according to some embodiments.

FIG. 4 illustrates patterns organization 400 according to some embodiments. According to some embodiments, composite patterns 410 (and/or reference implementations) may be solution oriented and be created for an architecture style such as MPA, SPA, EDA, microservices style applications, etc. using one or more foundational patterns. These patterns may serve as reference implementations which are reusable and leveraged by solution delivery teams to deliver solutions to common business problems. The foundational patterns 420 may consists of DevSecOps, deployment, and integration patterns that are implemented using primitives 430 and guardrail 440 policies and best practices. The primitive 430 services may be associated with cloud computing (e.g., AWS) services that are enabled by Common Table Expressions ("CTE") as products in the AWS service catalog (e.g., Route 53, Simple Storage Service ("S3"), Application Load Balancer ("ALB"), etc.) and are implemented using guardrail 440 policies and best practices. The guardrail 440 policies and best practices might be based on, for example, cloud design principles around compute, network, security, storage, databases with a focus on monitoring, audit, legal, and compliance to be embedded into the primitive 430, foundational 420, and composite 410 patterns.

Figure 5:
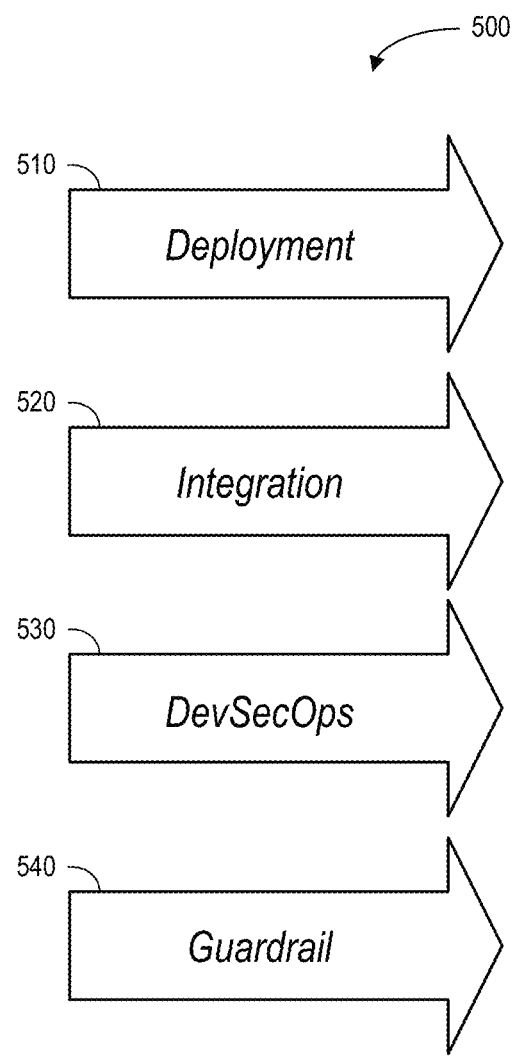
FIG. 5 are some pattern examples in accordance with some embodiments.

FIG. 5 are some pattern examples 500 in accordance with some embodiments. The deployment patterns 510 might include a Single Page Application ("SPA") using: Angular JavaScript as the front end; an AMAZON® WEB SERVICE ("AWS") Lambda, Elastic Container Service ("ECS"), or Elastic Kubernetes Service ("EKS") as the backend; and a Relational Database Service ("RDS") PostGreSQL as the database. As another example, the deployment patterns 510 could include a Multi-Page Application ("MPA") with an Apache Web server, JBoss application server and Aurora PostGreSQL as the database. Other examples may include: a Commercial-Off-The-Shelf ("COTS") application deployed in an Elastic Compute Cloud ("EC2") or EKS cluster; a monolithic backend application deployed in an EC2 cluster; a microservices-based application deployed in EKS or ECS cluster; a workflow-based application deployed using Step Function and Lambda; etc.

The integration patterns 520 might include, for example, integrating two components or applications using Application Programming Interface ("API"), event, database, or file-based integration within the same AWS accounts. The integration patterns 520 could also include integrating two components or applications using API, event, database, or file-based integration where each component is in different AWS accounts. Similarly, the integration patterns 520 could include integrating two components or applications using API, event, database, or file-based integration where one component is in an AWS and the other is an on-premises implementation. As still another example, two components or applications might be implements (again using either API, event, or file-based integration where one component is in an AWS account and the other is in a vendor Software-as-a-Service ("SaaS") platform or a vendor AWS account, etc.

The DevSecOps patterns 530 might include, for example, a two-stage pipeline with the ability to scan Infrastructure-as-Code ("IaC") and code artifacts to be deployed into a Lambda and a container-based runtime or a three-stage pipeline with ability to scan IaC and code artifacts to be deployed into a Lambda and a container based runtime. As other examples, the DevSecOps patterns 530 might include a single stage pipeline with an ability to scan IaC and code artifacts to be deployed into a Lambda and a container-based runtime, an on-premises pipeline with the ability to scan IaC and code artifacts to be deployed into a EC2 runtime, etc.

The guardrail patterns 540 might include, for example, a Multi-Account Creation ("MAC") policy (one per LOB, one per team, etc.) or an AWS organization policy (Secure Copy Protocol ("SCP"), permission boundaries, etc.). Other examples of guardrail patterns 540 might include a Virtual Private Cloud ("VPC") creation policy (e.g., subnet types, a subnet Classless Inter-Domain Routing ("CIDR") allocation, a VPC prefix list, etc.), an AWS landing zone configuration, or Security Group ("SG") policies for services that have SGs (e.g., Application Load Balancer ("ALB") Network Access Control List ("NACL")) policies for a subnet, egress/ingress routing configuration policies for a LOB VPC, etc.

Figure 6:
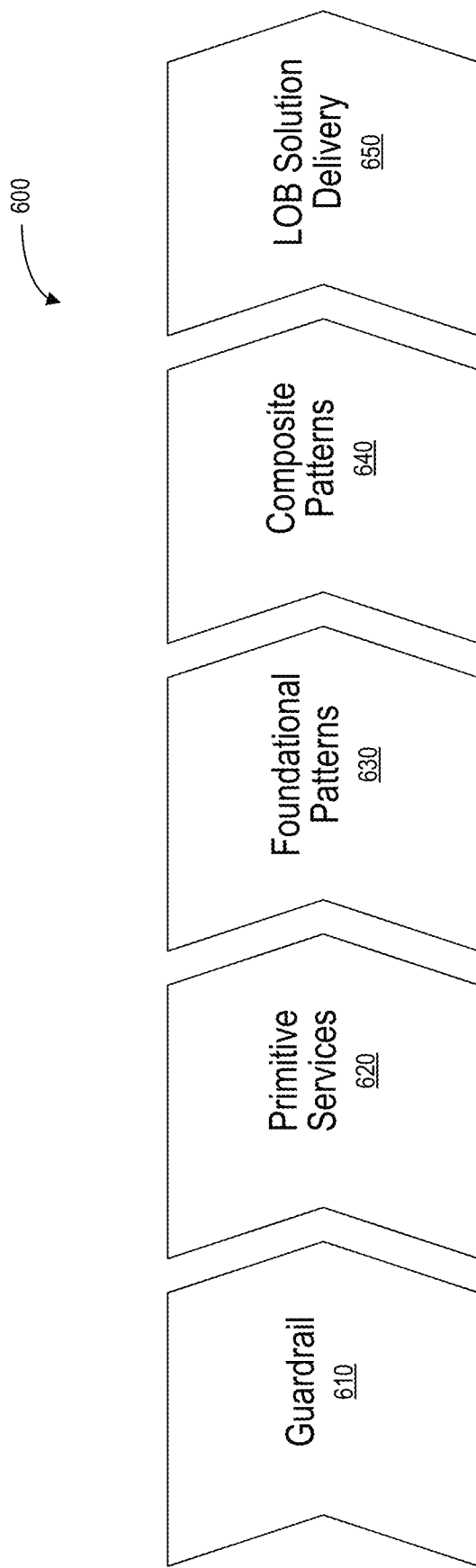
FIG. 6 is a patterns operationalization flow according to some embodiments.

FIG. 6 is a patterns operationalization flow 600 according to some embodiments. According to some embodiments, documentation associated with guardrail policies 610 and best practices are uploaded to a GitHub® open collaboration, free content, online documentation service maintained by volunteers (e.g., "Wikipedia" or "a wiki"). Moreover, primitive services 620 may be registered as products in a service catalog (and their corresponding documentation may be in a GitHub® wiki). Similarly, documentation associated with foundational patterns 630 and their corresponding IaC templates may be uploaded to a GitHub® repository and wiki. According to some embodiments, a reference implementation for each composite pattern 640 is also placed in the GitHub® repository that consists of the IaC for that pattern and a sample "Hello World" application that shows how to use the pattern. According to some embodiments, delivery teams may clone the GitHub® repo for a composite pattern 640 of their choice and enhance it (or compose a solution from foundational patterns 630) to meet use case requirements for a LOB solution delivery 650.

Figure 7:
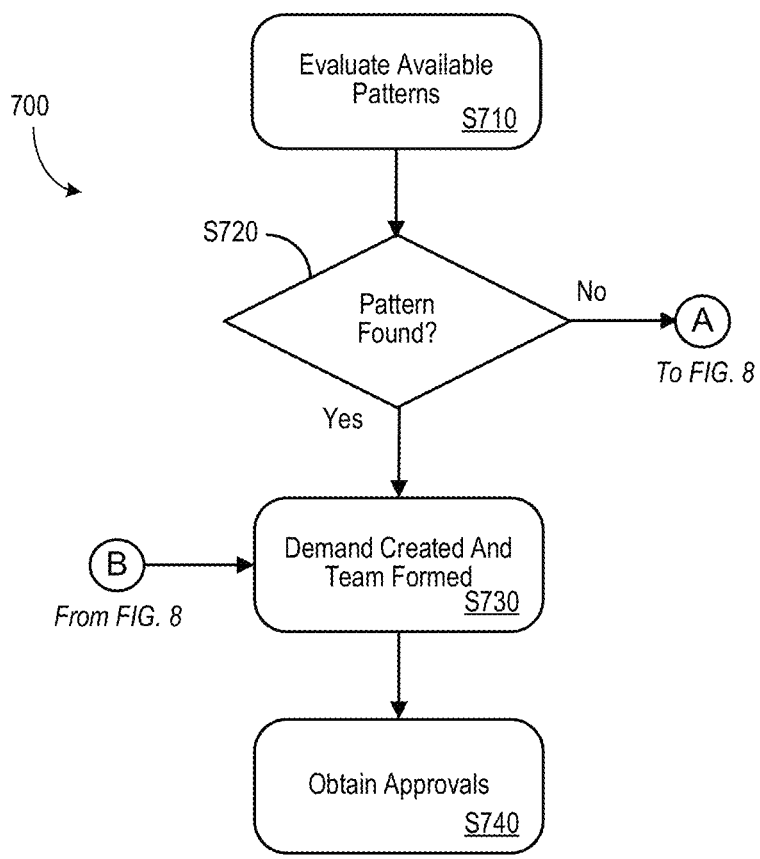
FIG. 7 is a patterns governance method in accordance with some embodiments.

FIG. 7 is a patterns governance method 700 that might be performed, for example, when an enterprise application is be migrated to a cloud computing environment. At S710, available patterns may be evaluated. For example, an architecture team and implementation review forum might browse a catalogue of available pattern templates looking for a suitable match. If a pattern is not found at S720, the migration continues at FIG. 8. If a pattern is found at S720, a demand (e.g., a work ticket) is created and a team may be formed at S730. The team might be associated with, for example, a solution architecture, security, a technology deliver manager, etc. According to some embodiments, approvals may be sought at S740. The approvals might be associated with, for example, the logical and/or physical design of the application (e.g., in connection with an architecture assurance review for strategic alignment and design quality). Other examples of approvals at S740 include a security assessment and rating, a disaster recovery plan, risk acceptance or mitigation plans, automated provisioning (e.g., using pipelines), review by a change request board, a permit to operate a tollgate for operational readiness, etc.

Figure 8:
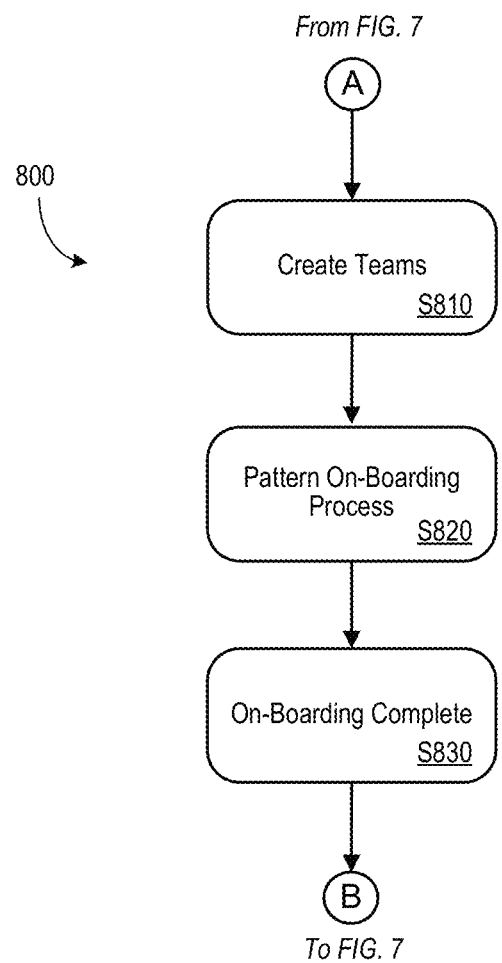
FIG. 8 is a patterns on-boarding process according to some embodiments.

FIG. 8 is a patterns on-boarding process 800 that is performed when no suitable pattern was identified in the catalogue according to some embodiments. At S810, appropriate teams may be created. The teams involved might include, for example, security, a cloud engineering group, infrastructure services, application development, etc. At S820, the pattern on-boarding process may continue. For example, one or more guardrail patterns may be included, and the team could potentially create new primitive services in the service catalog. Similarly, the team might create one or more new deployment, integration, and/or DevSecOps patterns. The team may also evaluate other projects in the pipeline (e.g., future move groups) to plan a next set of patterns to be created. At S830, the pattern on-boarding process is completed, and the migration continues with the application on-boarding process (S730 of FIG. 7).

Figure 9:
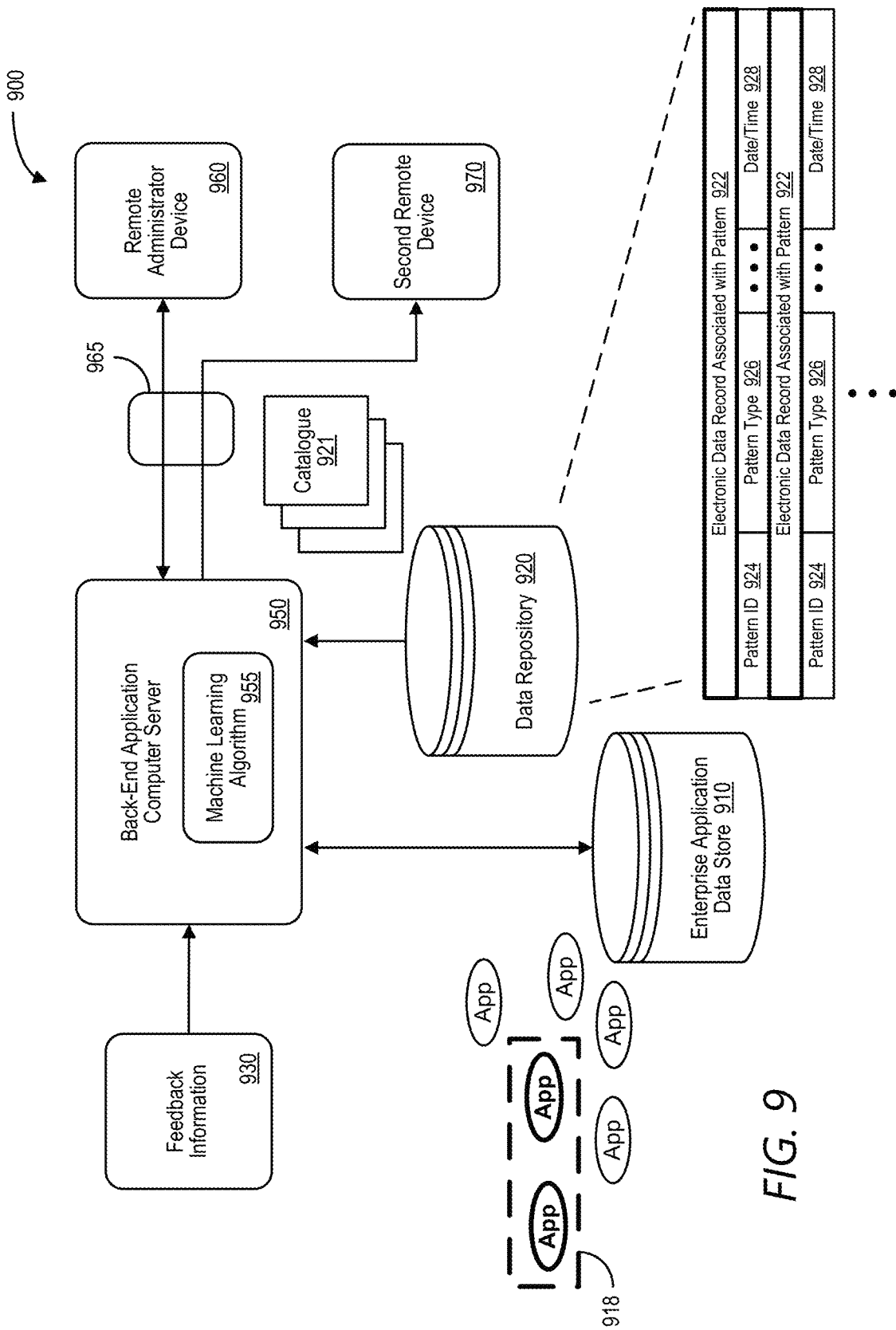
FIG. 9 is a more detailed block diagram of an application migration framework according to some embodiments.

FIG. 9 is a more detailed block diagram of an application migration framework or system 900 according to some embodiments. As before, the system 900 includes a back-end application computer server 950 that may access information in an enterprise application data store 910 (e.g., storing a set of electronic records associated with a move group 918 of applications to be migrated). The back-end application computer server 950 may also utilize information in other data stores, such as a data repository 920 (e.g., storing a catalogue 921 that comprises electronic records associated with patterns 922, a pattern identifier 924, a pattern type 926, and a date/time 928) and utilize a machine learning algorithm 955 to view, analyze, and/or update the electronic records. As used herein, the phrase "machine learning algorithm" may refer to any artificial intelligence process trained using historical data and/or outcomes.

The back-end application computer server 950 may also exchange information with a first remote administrator device 960 and a second remote administrator device 970 (e.g., via a firewall 965). According to some embodiments, an interactive GUI platform of the back-end application computer server 950 (and, in some cases, feedback information 930) may be used to further train and improve the machine learning algorithm 955 and/or the remote administrator devices 960, 970. For example, the first remote administrator device 960 may transmit annotated and/or updated information to the back-end application computer server 950. Based on the updated information, the back-end application computer server 950 may adjust data in the enterprise application data store 910 and/or the data repository 920 (e.g., information to automatically facilitate with the migration of the move group 918 to a cloud computing environment) and the change might (or might not) be viewable via the second remote administrator device 970.

The back-end application computer server 950 and/or the other elements of the system 900 might be, for example, associated with a PC, laptop computer, smartphone, an enterprise server, a server farm, and/or a database or similar storage devices. As used herein, devices, including those associated with the back-end application computer server 950 and any other device described herein, may exchange information via any communication network which may be one or more of a LAN, a MAN, a WAN, a proprietary network, a PSTN, a WAP network, a Bluetooth network, a wireless LAN network, and/or an IP network such as the Internet, an intranet, or an extranet.

The back-end application computer server 950 may store information into and/or retrieve information from the enterprise application data store 910 and/or the data repository 920. The data elements 910, 920 may be locally stored or reside remote from the back-end application computer server 950. As will be described further below, the enterprise application data store 910 may be used by the back-end application computer server 950 in connection with an interactive GUI to let an operator or administrator access and/or update electronic records. Although a single back-end application computer server 950 is shown in FIG. 9, any number of such devices may be included.

Figure 10:
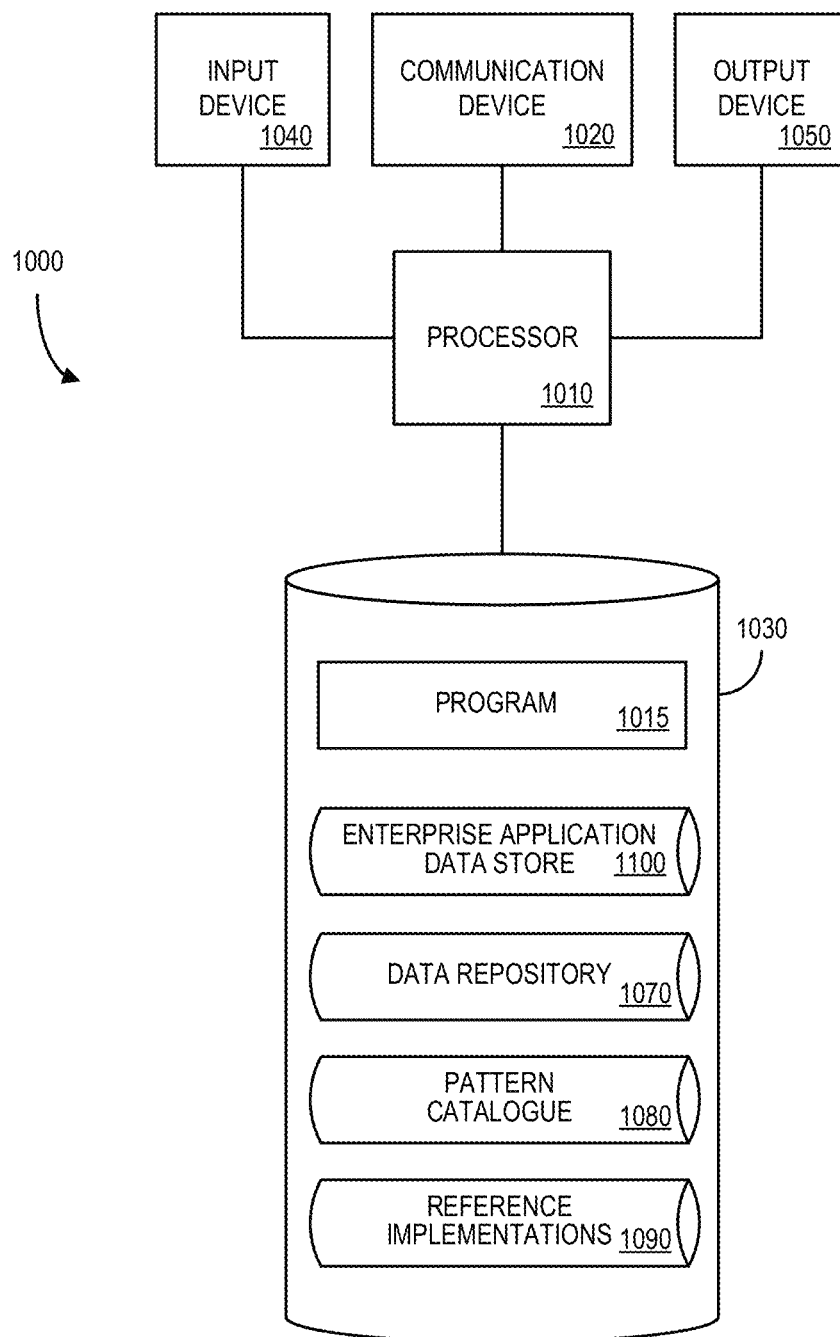
FIG. 10 is a block diagram of an apparatus in accordance with some embodiments of the present invention.

The embodiments described herein may be implemented using any number of different hardware configurations. For example, FIG. 10 illustrates an apparatus 1000 that may be, for example, associated with the systems 100, 900 described with respect to FIGS. 1 and 9, respectively. The apparatus 1000 comprises a processor 1010, such as one or more commercially available Central Processing Units ("CPUs") in the form of one-chip microprocessors, coupled to a communication device 1020 configured to communicate via a communication network (not shown in FIG. 10). The communication device 1020 may be used to communicate, for example, with one or more remote administrator devices (e.g., PCs and smartphones), administrator computers, and/or third-party platforms. Note that data exchanged via the communication device 1020 may utilize security features, such as encryption between an emergency responder and an internal network of an insurance company and/or telematics enterprise. The security features might be associated with, for example, web servers, firewalls, and/or PCI infrastructure. The apparatus 1000 further includes an input device 1040 (e.g., a mouse and/or keyboard to enter information about data sources, a cloud computing environment, vendors, etc.) and an output device 1050 (e.g., to output reports regarding migration performance, summary logs, recommended actions, alerts, etc.).

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1015 and/or application migration framework or application for controlling the processor 1010. The processor 1010 performs instructions of the program 1015, and thereby operates in accordance with any of the embodiments described herein. For example, the processor 1010 may retrieve information from an enterprise application data store 1100 and, based on enterprise application parameters, create a move group representing a subset of the enterprise applications. For each application in the move group, the processor 1010 may identify whether an appropriate cloud computing pattern exists in a pattern catalogue 1080. If an appropriate cloud computing pattern is identified, the processor 1010 uses it to automatically create a reference implementation of the enterprise application in a cloud computing environment. If no appropriate cloud computing pattern is identified, the processor 1010 initiates a pattern on-boarding process to add a new cloud computing pattern to the product catalogue 1080.

The program 1015 may be stored in a compressed, uncompiled and/or encrypted format. The program 1015 may furthermore include other program elements, such as an operating system, a database management system, and/or device drivers used by the processor 1010 to interface with peripheral devices.

As used herein, information may be "received" by or "transmitted" to, for example: (i) the apparatus 1000 from another device; or (ii) a software application or module within the apparatus 1000 from another software application, module, or any other source.

In some embodiments (such as shown in FIG. 10), the storage device 1030 further stores the enterprise application data store 1100 (e.g., associated with on-premises business applications to be automatically migrated), a data repository 1070 (e.g., associated with GITHUB®), a pattern catalogue 1080 (e.g., containing pattern descriptions), and reference implementation 1090 (e.g., storing items that can be executed in the cloud computing environment). An example of a database that might be used in connection with the apparatus 1000 will now be described in detail with respect to FIG. 11. Note that the database described herein is only an example, and additional and/or different information may be stored therein. Moreover, various databases might be split or combined in accordance with any of the embodiments described herein. For example, the enterprise application data store 1100 and pattern catalogue 1080 might be combined and/or linked to each other within the program 1015.

Figure 11:
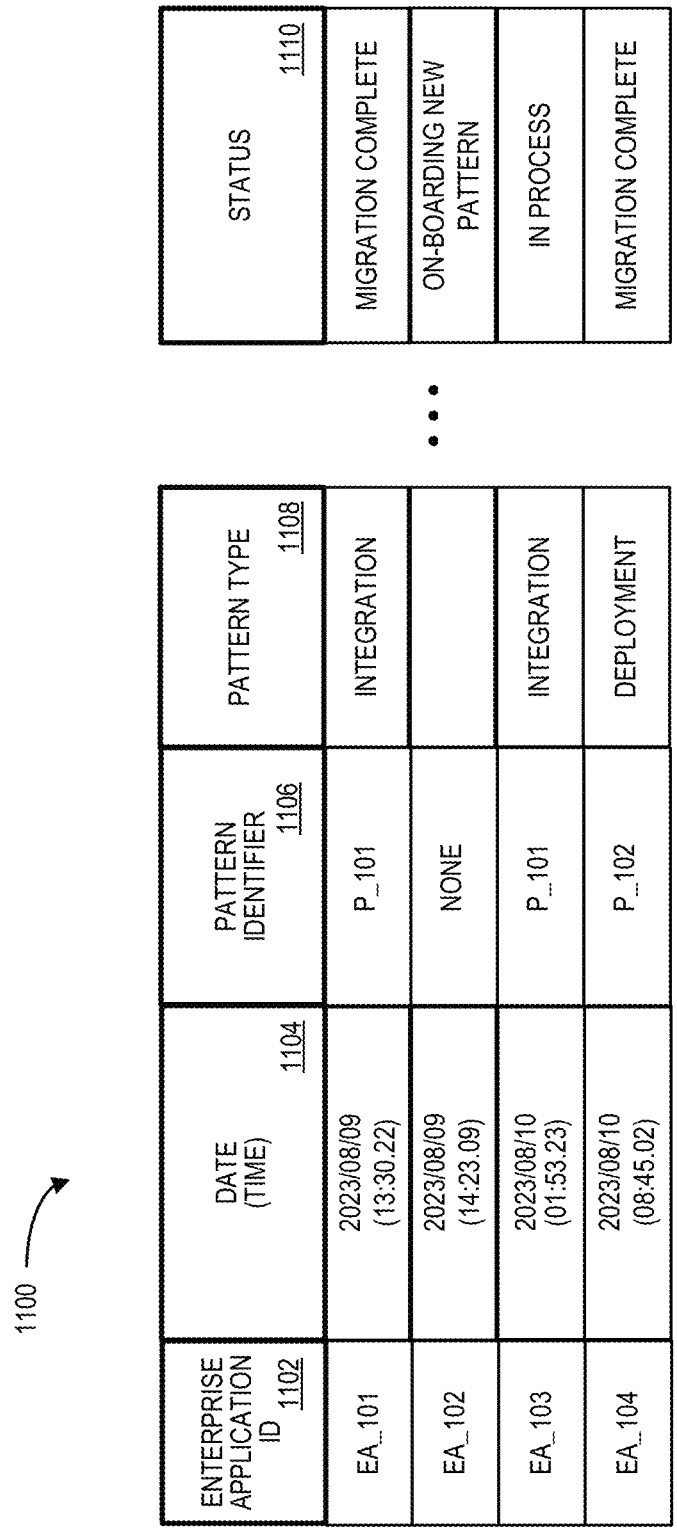
FIG. 11 is a portion of an incident data store according to some embodiments.

Referring to FIG. 11, a table is shown that represents the enterprise application data store 1100 that may be stored at the apparatus 1000 according to some embodiments. The table may include, for example, entries associated with on-premises business applications that will migrate to a cloud computing environment. The table may also define fields 1102, 1104, 1106, 1108, 1110 for each of the entries. The fields 1102, 1104, 1106, 1108, 1110 may, according to some embodiments, specify: an enterprise application identifier 1102, date and time 1104, a pattern identifier 1106, a pattern type 1108, and a status 1110. The enterprise application data store 1100 may be created and updated, for example, based on information electrically received from various data sources (e.g., including when a new move group is identified) that are associated with a business such as an insurance provider.

The enterprise application identifier 1102 may be, for example, a unique alphanumeric code associated with an on-premises business application to be migrated to a cloud computing environment. The date and time 1104 might indicate when the record was last updated or when the migration is schedule to occur. The pattern identifier 1106 might indicate an appropriate template (if any) that was identified in a catalogue. The pattern type 1108 might indicate if the identified pattern is an integration pattern, deployment pattern, DevSecOps pattern, etc. The status 1110 might indicate if the business application migration is in process, complete, if a new template is being created, etc.

Thus, embodiments may provide an automated and efficient way to migrate applications to a cloud computing environment in a way that provides fast and useful results (and that allows for flexibility and effectiveness when implementing those results). Cloud adoption might be accelerated because migration teams don't need to "reinvent the wheel" to migrate applications to the cloud. Embodiments may provide a consistent approach to cloud application development and deployment using highly reusable reference architecture patterns and their reference implementations (which may substantially reduce operational costs). Patterns may kick-start a development team's journey into the cloud without overwhelming the team with the new cloud services (e.g., AWS has over 200 services) improving speed-to-market while delivering business value to customers.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to specific types of enterprises and business applications, embodiments may instead be associated with other types of enterprises and applications in addition to and/or instead of those described herein (e.g., financial institutions, universities, etc.). Similarly, although certain types of parameters were described in connection some embodiments herein, other types of parameters might be used instead of, or in addition to, those mentioned.

Figure 12:
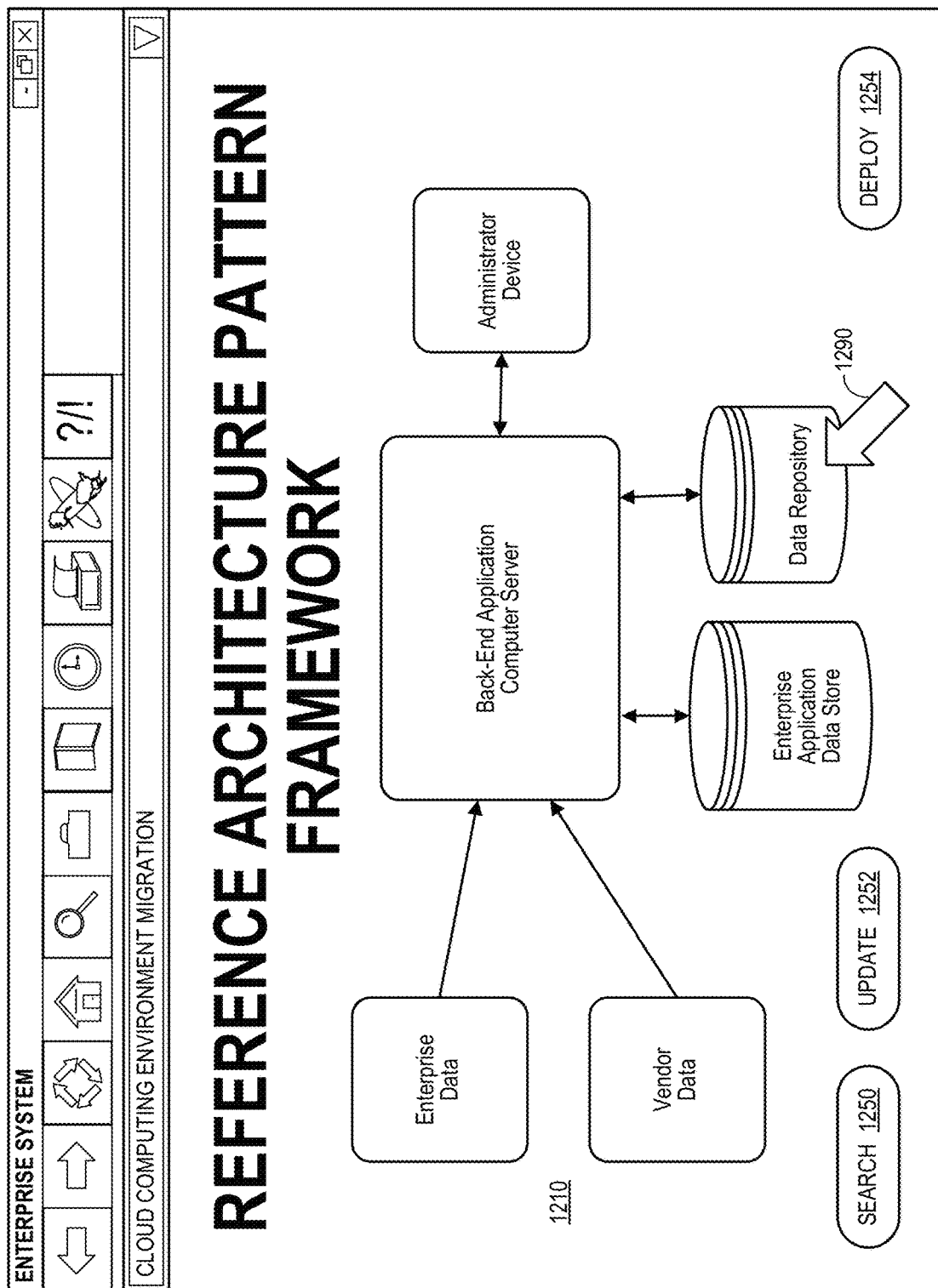
FIG. 12 illustrates an administrator display in accordance with some embodiments.

Note that the displays and devices illustrated herein are only provided as examples, and embodiments may be associated with any other types of interfaces. For example, FIG. 12 is a reference architecture pattern framework administrator display 1200 including graphical representations of elements 1210 of an application migration framework. Selection of a portion or element of the display 1200 might result in the presentation of additional information about that portion or device (e.g., a popup window presenting a more detailed view of mappings or other specifics of the system implementation) or let an administrator enter or annotate additional information about application migration framework (e.g., based on his or her experience and expertise). Selection of a "Search" icon 1250 (e.g., by touchscreen or computer mouse pointer 1290) might cause the system or platform to search a catalogue of patterns looking for a pattern to facilitate migration. Selection of an "Update" icon 1252 might cause the system to refresh or store newly entered parameters (e.g., a data repository location or a cloud account identifier), and selection of an "Deploy" icon 1254 might cause the system or platform to automatically move a reference implementation to a cloud environment.

Figure 13:
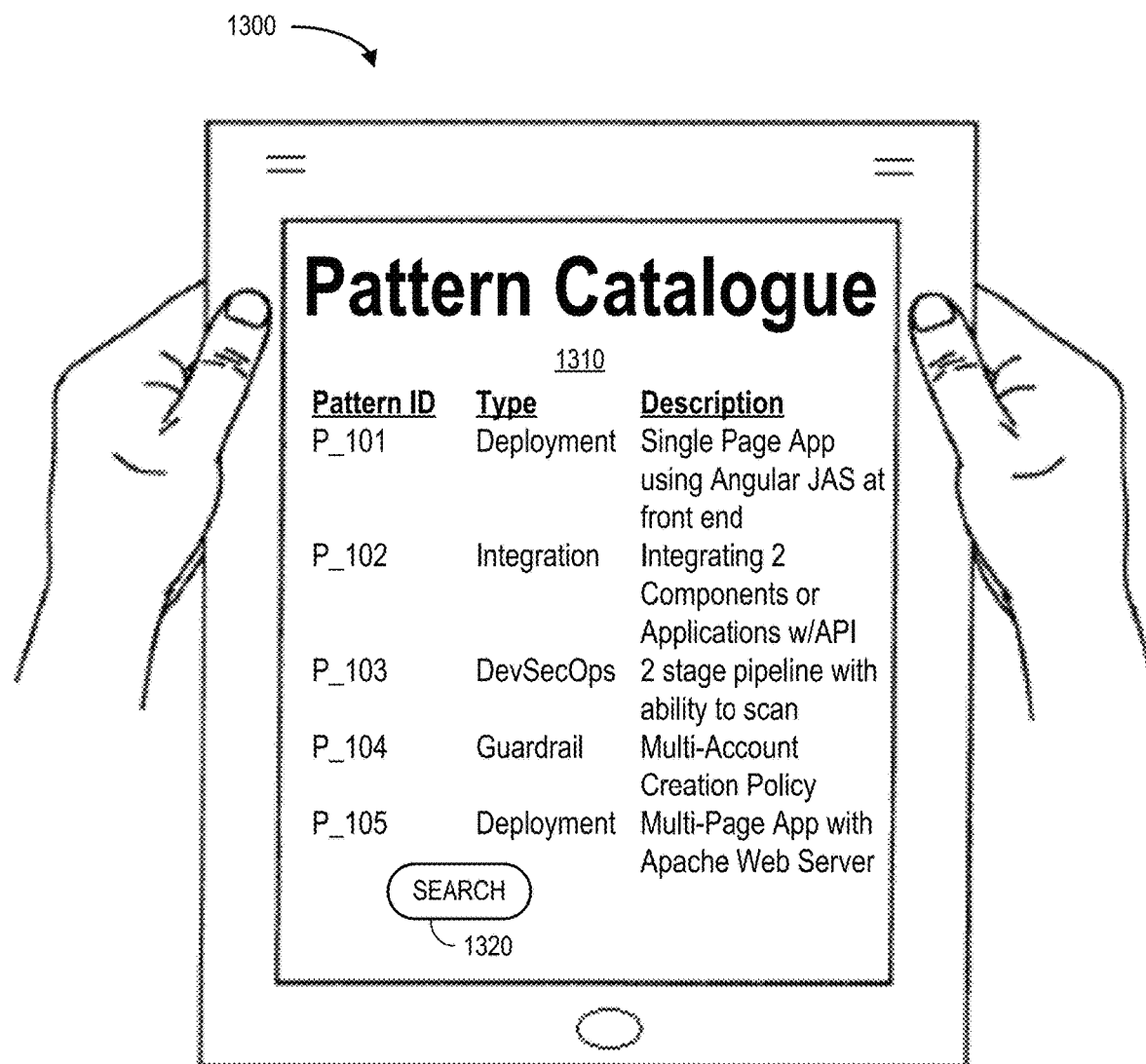
FIG. 13 illustrates a tablet computer display according to some embodiments.
Figure 14:
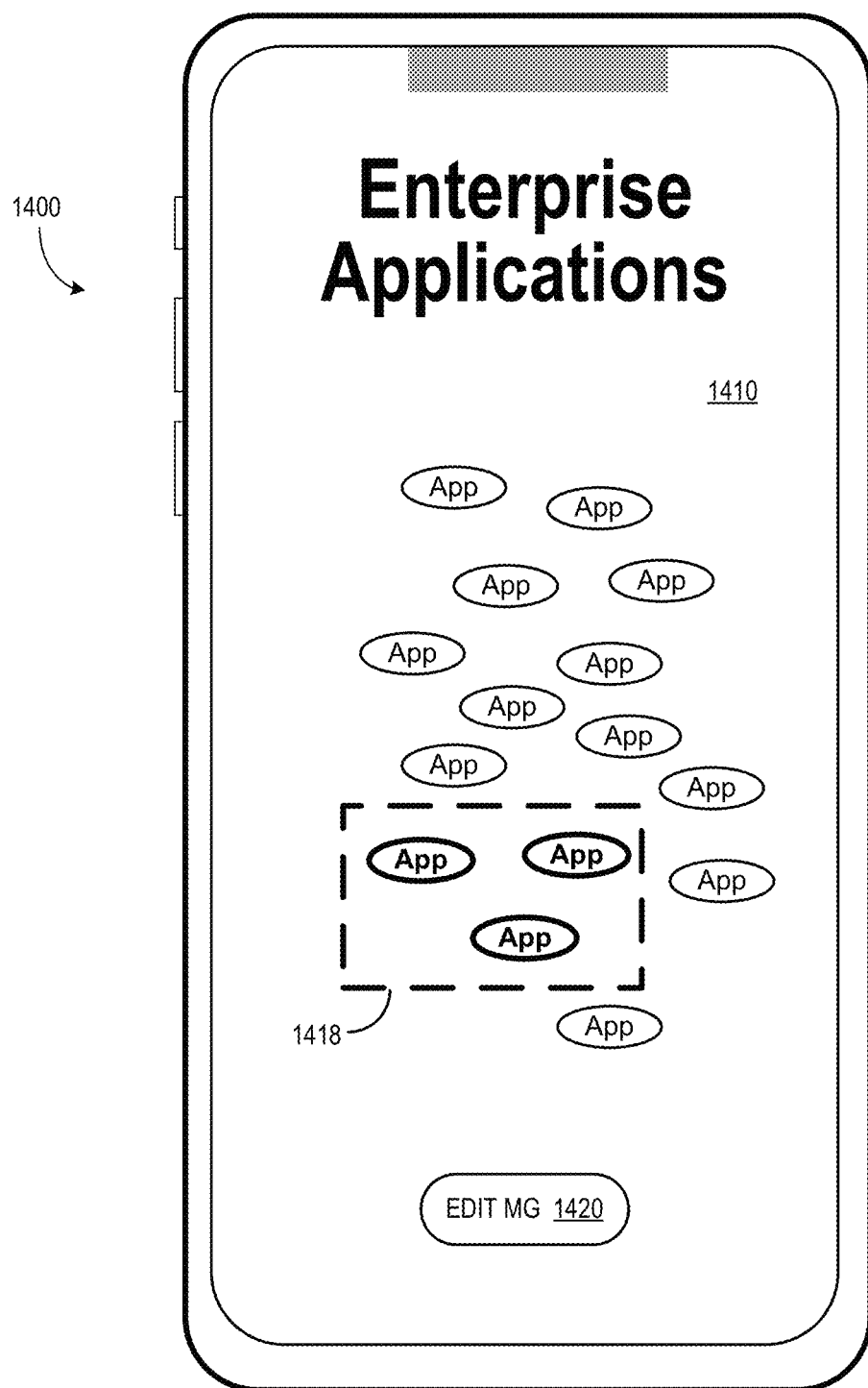
FIG. 14 illustrates a smartphone display in accordance with some embodiments.

The displays and devices illustrated herein are only provided as examples, and embodiments may be associated with any other types of user interfaces. For example, FIG. 13 illustrates a tablet computer 1300 with a pattern catalogue display 1310 according to some embodiments. The display 1310 includes a list of all available patterns that might be useful when performing an application migration. Selection of a "Search" icon 1320 might result in the automatic display of patterns that are particularly likely to be of use (e.g., as predicted by a machine learning algorithm). Similarly, FIG. 14 illustrates a smartphone 1400 enterprise applications display 1410 in accordance with some embodiments. The display 1410 includes a set of applications to be migrated and an indication of a move group 1418 of application that might be migrated together (e.g., as recommended by a machine learning algorithm). Selection of a "Edit MG" icon 1420 might let a user add or remove applications from the move group 1418.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed is:

1. A cloud migration system implemented via a back-end application computer server, comprising:
   (a) an enterprise application data store that contains electronic records associated with a set of enterprise applications, each electronic record including an electronic record identifier and at least one enterprise application parameter;
   (b) a data repository storing a catalogue of cloud computing patterns including integration patterns or templates, deployment patterns, and development, security, and operations patterns, wherein the patterns further include Multi-Page Applications ("MPA"), Event Driven Architectures ("EDA"), and microservices;
   (c) the back-end application computer server, coupled to the enterprise application data store and the data repository, including:
   a computer processor, and
   a computer memory, coupled to the computer processor, storing instructions that, when
   executed by the computer processor, cause the back-end application computer server to:
   (i) retrieve information from the enterprise application data store, (ii) based on at least one enterprise application parameter, automatically create a move group representing a subset of the enterprise applications in the enterprise application data store, and (iii) for each enterprise application in the move group:
identify whether an appropriate cloud computing pattern exists in the catalogue of cloud computing patterns,
if an appropriate cloud computing pattern is identified, use the identified cloud computing pattern to automatically create a reference implementation of the enterprise application in a cloud computing environment, and
if no appropriate cloud computing pattern is identified, initiate a pattern on-boarding process to add a new cloud computing pattern to the catalogue stored in the data repository; and (d) a communication port coupled to the back-end application computer server to support an interactive graphical administrator interface display via a distributed communication network.

2. The system of claim 1, wherein the back-end application computer server, after migration of the move group is initiated, further begins to migrate a subsequent move group, and at least one appropriate cloud computing pattern for an enterprise application in the subsequent move group was added via a prior on-boarding process.

3. The system of claim 1, wherein the automatically created move group is further based on: (i) technology stacks, (ii) enterprise lines of business, and (iii) application dependencies.

4. The system of claim 1, wherein the set of enterprise applications in the enterprise application data store are associated with at least one of: (i) on-premises applications, and (ii) legacy applications.

5. The system of claim 1, wherein patterns are associated with at least one of: (i) composite patterns, and (ii) reference implementations.

6. The system of claim 5, wherein patterns are associated with at least one of: (i) an integration type, (ii) an inbound flow direction, and (iii) an outbound flow direction.

7. The system of claim 5, wherein patterns are associated with at least one of: (i) foundational patterns, (ii) primitive patterns, and (ii) guardrail patterns.

8. The system of claim 1, wherein the data repository includes version control.

9. A computerized cloud migration method implemented via a back-end application computer server, comprising:
retrieving, by a computer processor of the back-end application computer server, information from an enterprise application data store that contains electronic records associated with a set of enterprise applications, each electronic record including an electronic record identifier and at least one enterprise application parameter;
based on at least one enterprise application parameter, automatically creating a move group representing a subset of the enterprise applications in the enterprise application data store; and
for each enterprise application in the move group:
identifying whether an appropriate cloud computing pattern exists in a catalogue of cloud computing patterns stored at a data repository, wherein the catalogue includes integration patterns or templates, deployment patterns, and development, security, and operations patterns, and further wherein the patterns include, Multi-Page Applications ("MPA"), Event Driven Architectures ("EDA"), and microservices,
if an appropriate cloud computing pattern is identified, using the identified cloud computing pattern to automatically create a reference implementation of the enterprise application in a cloud computing environment, and
if no appropriate cloud computing pattern is identified, initiating a pattern on-boarding process to add a new cloud computing pattern to the catalogue stored in the data repository.

10. The method of claim 9, wherein the back-end application computer server, after migration of the move group is initiated, further begins to migrate a subsequent move group, and at least one appropriate cloud computing pattern for an enterprise application in the subsequent move group was added via a prior on-boarding process.

11. The method of claim 9, wherein the automatically created move group is further based on: (i) technology stacks, (ii) enterprise lines of business, and (iii) application dependencies.

12. The method of claim 9, wherein the set of enterprise applications in the enterprise application data store are associated with at least one of: (i) on-premises applications, and (ii) legacy applications.

13. A non-transitory, computer-readable medium storing instructions, that, when executed by a processor, cause the processor to perform a cloud migration method implemented via a back-end application computer server, the method comprising:
retrieving, by a computer processor of the back-end application computer server, information from an enterprise application data store that contains electronic records associated with a set of enterprise applications, each electronic record including an electronic record identifier and at least one enterprise application parameter;
based on at least one enterprise application parameter, automatically creating a move group representing a subset of the enterprise applications in the enterprise application data store; and
for each enterprise application in the move group:
identifying whether an appropriate cloud computing pattern exists in a catalogue of cloud computing patterns stored at a data repository, wherein the catalogue includes integration patterns or templates, deployment patterns, and development, security, and operations patterns, and further wherein the patterns include Multi-Page Applications ("MPA"), Event Driven Architectures ("EDA"), and microservices,
if an appropriate cloud computing pattern is identified, using the identified cloud computing pattern to automatically create a reference implementation of the enterprise application in a cloud computing environment, and
if no appropriate cloud computing pattern is identified, initiating a pattern on-boarding process to add a new cloud computing pattern to the catalogue stored in the data repository.

14. The medium of claim 13, wherein the back-end application computer server, after migration of the move group is initiated, further begins to migrate a subsequent move group, and at least one appropriate cloud computing pattern for an enterprise application in the subsequent move group was added via a prior on-boarding process.

15. The medium of claim 13, wherein patterns are associated with at least one of: (i) composite patterns, and (ii) reference implementations.

16. The medium of claim 15, wherein patterns are associated with at least one of: (i) an integration type, (ii) an inbound flow direction, and (iii) an outbound flow direction.

17. The medium of claim 15, wherein patterns are associated with at least one of: (i) foundational patterns, (ii) primitive patterns, and (ii) guardrail patterns.

18. The medium of claim 13, wherein the data repository includes version control.

* * * * *